(12) United States Patent
Pek

(10) Patent No.: US 8,590,339 B2
(45) Date of Patent: Nov. 26, 2013

(54) METHOD AND APPARATUS FOR PROVIDING UNIFORMITY OF VAPOUR AND LIQUID PHASES IN A MIXED STREAM

(75) Inventor: Johan Jan Barend Pek, The Hague (NL)

(73) Assignee: Shell Oil Company, Houston, TX (US)

( * ) Notice: Subject to any disclaimer, the term of this patent is extended or adjusted under 35 U.S.C. 154(b) by 979 days.

(21) Appl. No.: 12/515,552

(22) PCT Filed: Nov. 20, 2007

(86) PCT No.: PCT/EP2007/062547
§ 371 (c)(1),
(2), (4) Date: May 20, 2009

(87) PCT Pub. No.: WO2008/061972
PCT Pub. Date: May 29, 2008

(65) Prior Publication Data
US 2010/0058784 A1    Mar. 11, 2010

(30) Foreign Application Priority Data
Nov. 22, 2006  (EP) ..................... 06124548

(51) Int. Cl.
*F25J 1/00*    (2006.01)
*F17C 7/02*    (2006.01)

(52) U.S. Cl.
USPC ................. 62/612; 62/50.1; 62/606

(58) Field of Classification Search
USPC ............ 62/50.1, 85, 123, 612, 606, 611, 613
See application file for complete search history.

(56) References Cited

U.S. PATENT DOCUMENTS

| | | | |
|---|---|---|---|
| 5,150,749 A | 9/1992 | Bergmann et al. | 165/115 |
| 5,254,292 A | 10/1993 | Gabryelczyk et al. | 261/76 |
| 6,389,844 B1 | 5/2002 | Klein Nagel Voort | 62/612 |

FOREIGN PATENT DOCUMENTS

| | | | |
|---|---|---|---|
| DE | 8810901 | 10/1988 | |
| EP | 360034 | 3/1990 | |
| EP | 1088192 | 1/2002 | |
| FR | 2682610 | 4/1993 | |
| GB | 1119699 | 7/1968 | |
| JP | 60232494 | 11/1985 | F28D 3/00 |
| SU | 158896 | 11/1962 | |
| SU | 1814716 | 5/1993 | F25B 39/00 |

*Primary Examiner* — Chen Wen Jiang

(57) ABSTRACT

In method of providing uniformity of vapor and liquid phases in two or more streams derived from a mixed vapor and liquid stream (10), the mixed vapor and liquid stream (10) passes from a first heat exchanger (101) into a distribution vessel (12) via one or more inlets (14). The distribution vessel (12) has two or more outlets (16) connected to a second heat exchanger (102). The liquid part of the mixed stream (10) is allowed to collect in a first area (20) in the distribution vessel (12), and the vapor part of the mixed stream (10) is allowed to collect in a second area (30) of the distribution vessel (12), preferably above the first area (20). The liquid in the first area (20) passes into the outlets (16) via one or more liquid apertures (18) in each outlet (16) that communicate with the first area (20), and the vapor in the second area (30) passes into the outlets (16) via one or more vapor apertures (28) in each outlet (16) communicating with the second area (30).

19 Claims, 3 Drawing Sheets

METHOD AND APPARATUS FOR PROVIDING UNIFORMITY OF VAPOUR AND LIQUID PHASES IN A MIXED STREAM

The present application claims priority from European Patent Application 06124548.6 filed 22 Nov. 2006.

FIELD OF THE INVENTION

The present invention relates to a method and apparatus for providing uniformity of vapour and liquid phases in two or more streams derived from a mixed vapour and liquid stream, particularly but not exclusively a stream involved in liquefying a hydrocarbon stream such as natural gas.

In another aspect, the present invention relates to a method of cooling, preferably for liquefying, a hydrocarbon stream.

BACKGROUND OF THE INVENTION

Several methods of liquefying a natural gas stream thereby obtaining liquefied natural gas (LNG) are known. It is desirable to liquefy a natural gas stream for a number of reasons. As an example, natural gas can be stored and transported over long distances more readily as a liquid than in gaseous form, because it occupies a smaller volume and does not need to be stored at a high pressure.

Usually natural gas, comprising predominantly methane, enters an LNG plant at elevated pressures and is pre-treated to produce a purified feedstock suitable for liquefaction at cryogenic temperatures. The purified gas is processed through a plurality of cooling stages using heat exchangers to progressively reduce its temperature until liquefaction is achieved. The liquid natural gas is then further cooled and expanded to final atmospheric pressure suitable for storage and transportation. The flashed vapour from each expansion stage can be used as a source of plant fuel gas.

In such LNG plants, streams comprising a mixture of vapour and liquid phases occur, for example between two heat exchangers. One example is shown in FIG. 3 of U.S. Pat. No. 6,389,844 B1.

U.S. Pat. No. 6,389,844 B1 relates to a plant for liquefying natural gas. FIG. 3 shows an embodiment for pre-cooling the natural gas, involving first and second stage heat exchangers 102' and 102. Between these first and second stage heat exchangers, there are two conduits 150 and 151, one for refrigerant and one for natural gas. The refrigerant, and occasionally the natural gas, are mixed vapour and liquid streams, and such streams are carried by a single conduit between the heat exchangers 102' and 102.

However, this way of passing streams between two heat exchangers may result in an uneven distribution of the vapour and liquid phases of the streams passing through the conduits 150 and 151. As a consequence, there may be non-uniform distribution of the vapour and liquid phases going into the second stage heat exchanger 102, which results in an uneven temperature distribution and therefore inefficiency in the second stage heat exchanger 102.

It is an object of the present invention to improve the uniformity of vapour and liquid phases in two or more streams derived from a mixed vapour and liquid stream.

It is a further object of the present invention to reduce the energy requirements of a cooling plant or method.

SUMMARY OF THE INVENTION

One or more of the above or other objects can be achieved by the present invention providing a method of providing uniformity of vapour and liquid phases in two or more streams derived from a mixed vapour and liquid stream, comprising the steps of:

(a) passing the mixed vapour and liquid stream from a first heat exchanger into a distribution vessel via one or more inlets, the distribution vessel having two or more outlets connected to a second heat exchanger;
(b) allowing the liquid part of the mixed stream to collect in a first area in the distribution vessel;
(c) allowing the vapour part of the mixed stream to collect in a second area of the distribution vessel, preferably above the first area of step (b);
(d) passing the liquid in the first area into the outlets via one or more liquid apertures in each outlet communicating with the first area; and
(e) passing the vapour in the second area into the outlets via one or more vapour apertures in each outlet communicating with the second area.

In a further aspect, the present invention provides apparatus for providing uniformity of vapour and liquid phases in two or more streams derived from a mixed vapour and liquid stream, the apparatus at least comprising:

a distribution vessel having one or more distribution vessel inlets and two or more distribution vessel outlets, said one or more distribution vessel inlets connected to the one or more outlets of a first heat exchanger and said two or more distribution vessel outlets connected to two or more inlets of a second heat exchanger;

a first area in the distribution vessel to collect the liquid of the mixed stream;

a second area in the distribution vessel to collect the vapour part of the mixed stream, preferably above the first area;

one or more liquid apertures in each outlet communicating with the first area, through which the liquid part of the mixed stream can pass; and one or more vapour apertures in each outlet communicating with the second area through which the vapour part of the mixed stream can pass.

In another aspect, the present invention provides a method of cooling a hydrocarbon stream such as natural gas, the method at least comprising the steps of:

(i) passing the hydrocarbon stream through a cooling stage involving two or more heat exchangers, between which heat exchangers a mixed vapour and liquid stream passes; and
(ii) using a distribution vessel as herein defined in the path of the mixed vapour and liquid stream between the heat exchangers.

BRIEF DESCRIPTION OF THE DRAWINGS

Embodiments of the present invention will now be described by way of example only, and with reference to the accompanying non-limiting diagrammatic drawings in which.

DETAILED DESCRIPTION OF THE INVENTION

Figure 1:
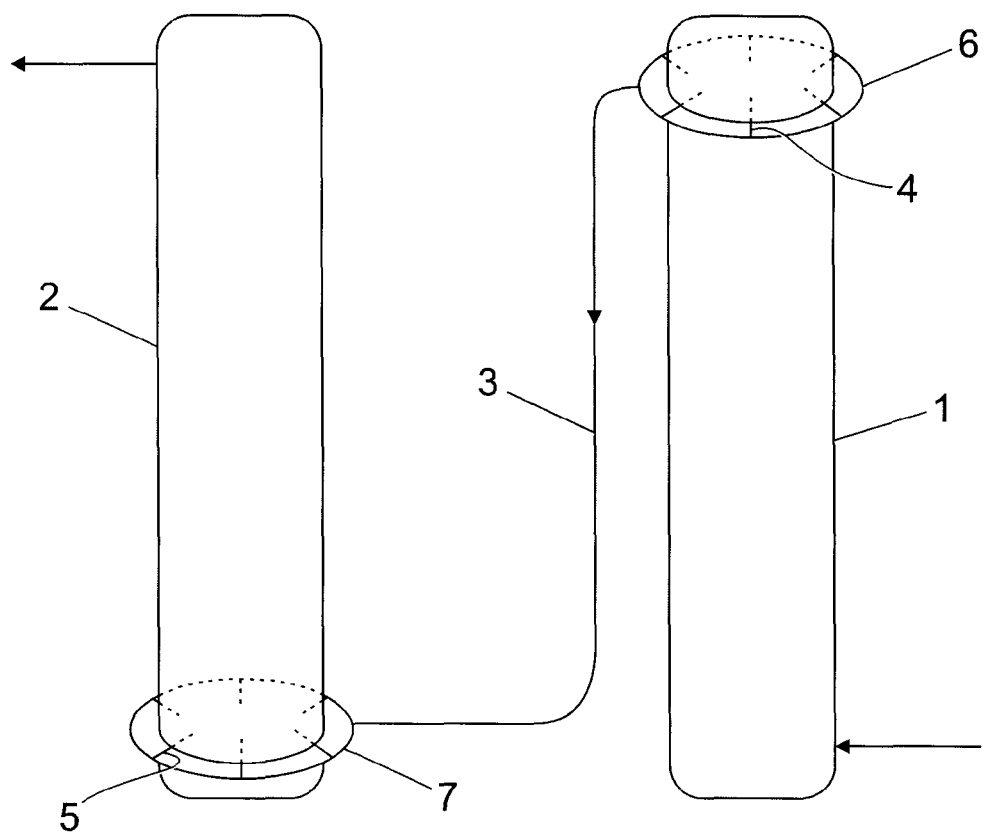
FIG. 1 is a simplified view of two heat exchangers connected according to one method.

For the purpose of this description, a single reference number will be assigned to a line as well as a stream carried in that line. Same reference numbers refer to similar components, streams or lines.

The use of a distribution vessel in the path of a mixed vapour and liquid stream provides that the distribution of the liquid and vapour phases in each of the outlet streams is more equal or uniform than the distribution in a conventional manner, for example using a distribution ring. By providing a more equal distribution of liquid and vapour phases from each outlet, there will be a more even temperature distribution of the streams in their next step or use.

Embodiments of the present invention may reduce the overall energy requirements of a method or plant or apparatus for cooling, in particular liquefying, a hydrocarbon stream, and/or make the method, plant or apparatus more efficient and so more economical.

Embodiments of the present invention extend to mixed vapour and liquid streams of refrigerant, preferably a mixed refrigerant, used to cool another stream or streams such as a hydrocarbon stream, for example natural gas. Many refrigerants are known, and include without limitation, natural gas itself, ethane, ethylene, propane, propylene, butane, pentane, and nitrogen, either as a single component, or using two or more to form a mixed refrigerant.

Although the methods described herein may be applicable to various hydrocarbon feed streams, it is particularly suitable for a natural gas stream to be liquefied. As the person skilled readily understands how to liquefy a hydrocarbon stream, this is not further discussed in detail herein.

The mixed vapour and liquid stream is provided as a flow from a first heat exchanger, and the outlet streams are provided to a second heat exchanger. The outlets may be directly connected to such a second heat exchanger, or may be connected to a bundle of tubes in such a heat exchanger. The first and second heat exchangers can be shell-and-tube heat exchangers, preferably spool-wound heat exchangers. In one embodiment, a natural gas stream is cooled in this way.

A hydrocarbon stream can be cooled, particularly liquefied, by passing it through two or more cooling stages. Any number of cooling stages can be used, and each cooling stage can involve one or more heat exchangers, as well as optionally one or more steps, levels or sections. Each cooling stage may involve two or more heat exchangers either in series, or in parallel, or a combination of same. Arrangements of suitable heat exchangers able to liquefy a hydrocarbon stream such as natural gas are known in the art.

In one arrangement, this involves the two cooling stages comprising a first cooling stage and a second cooling stage, the first stage being preferably a pre-cooling stage, and the second stage preferably being a main cryogenic stage.

The present invention may be used for any mixed vapour and liquid stream, including but not limited to a hydrocarbon stream to be cooled and/or liquefied.

A hydrocarbon stream for a cooling and/or liquefying method or plant may be any suitable hydrocarbon-containing stream to be liquefied, but is usually a natural gas stream obtained from natural gas or petroleum reservoirs. As an alternative the natural gas stream may also be obtained from another source, also including a synthetic source such as a Fischer-Tropsch process.

Usually natural gas is comprised substantially of methane. Preferably the hydrocarbon stream comprises at least 60 mol % methane, more preferably at least 80 mol % methane.

Depending on the source, the natural gas may contain varying amounts of hydrocarbons heavier than methane such as ethane, propane, butanes and pentanes as well as some aromatic hydrocarbons. The natural gas stream may also contain non-hydrocarbons such as $H_2O$, $N_2$, $CO_2$, $H_2S$ and other sulfur compounds, and the like.

If desired, the hydrocarbon stream may be pre-treated before using it in the present invention. This pre-treatment may comprise removal of any undesired components present such as $CO_2$ and $H_2S$, or other steps such as pre-cooling, pre-pressurizing or the like. As these steps are well known to the person skilled in the art, they are not further discussed here.

FIG. 1 shows a first heat exchanger 1, which could be, for example, a high pressure heat exchanger for use in a first or pre-cooling stage of a method and plant for liquefying a hydrocarbon stream such as natural gas. Such heat exchangers are well known in the art, and are usually 'multi-tube' or 'shell-and-tube' heat exchangers. Such heat exchangers can contain hundreds or thousands (or greater) small-diameter, vertical or spiral, and open-ended reactor tubes.

Usually, the tubes are collected into several 'bundles' which have a single bonnet, chamber, header or manifold designed to collect mixed vapour and liquid streams from all the tubes of that bundle, and pass them out of the top of the first heat exchanger 1 through an outlet. FIG. 1 shows six outlets 4 from the top of the first heat exchanger 1 having six bundles, which outlets 4 pass their streams into a collecting ring 6 which collects all the mixed vapour and liquid streams, and passes them as a combined stream into a single conduit 3 for passage to the next heat exchanger 2. A single conduit 3 for passage of all the mixed vapour and liquid streams to the next heat exchanger 2 has hitherto been regarded as most simple and economic arrangement because of the distance between the outflow of one heat exchanger and the inflow of another heat exchanger.

However, heat exchangers are not usually so uniform as to provide for the distribution or ratio of the mixed liquid and vapour phases of streams out of each of its tubes to be the same. Variation will occur, and this leads to variation in the distribution of the liquid and vapour phases passing out of the first heat exchanger 1 and through the interconnecting conduit 3 to the next heat exchanger 2. In general, this non-uniformity of the distribution and composition of the mixed vapour and liquid stream passing through the conduit 3 may cause a non-uniform distribution of the mixed stream into the second heat exchanger 2.

As described above for the first heat exchanger 1, the second heat exchanger 2 usually comprises hundreds or thousands of small diameter tubes, usually also collected into a number of 'bundles'. One common number of bundles is six. At or near the base of the heat exchanger 2, each bundle has a single bonnet, chamber, header or manifold designed to provide a stream of material into each tube from a common source. Usually, the source for each bundle of tubes is an inlet, and six inlets 5 are shown in FIG. 1. The inlets derive their stream of material from a distribution ring 7 supplied by the single conduit 3.

The distribution ring 7 is generally horizontal, so as to try and feed a liquid and vapour stream into each of the inlets 5 most efficiently from all sides of the second heat exchanger 2. However, any horizontal passage of a mixed liquid and vapour stream results in some stratifying of the phases due to the heavier weight of the liquid phase causing it to sink, and the generally faster speed of vapour, causing the vapour phase to flow faster over the sinking liquid phase. Thus, horizontal flow of a mixed vapour and liquid stream generally increases the non-uniformity of the liquid and vapour phases as they pass around the distribution ring 7 to reach each of the inlets 5. The further such streams travel horizontally, including around a distribution ring, the greater this stratifying effect.

As a result of the above, there is an uneven temperature distribution in the liquid and vapour phases over the length of the second heat exchanger 2. These can result in power misbalance between, for example, a first or pre-cooling stage of a liquefying plant using the first and second heat exchangers 1, 2 shown in FIG. 1, and a main liquefaction stage. This can lead to an increased power requirement for the main liquefaction stage and so an increase in the total power required for the liquefaction method or plant.

Figure 2:
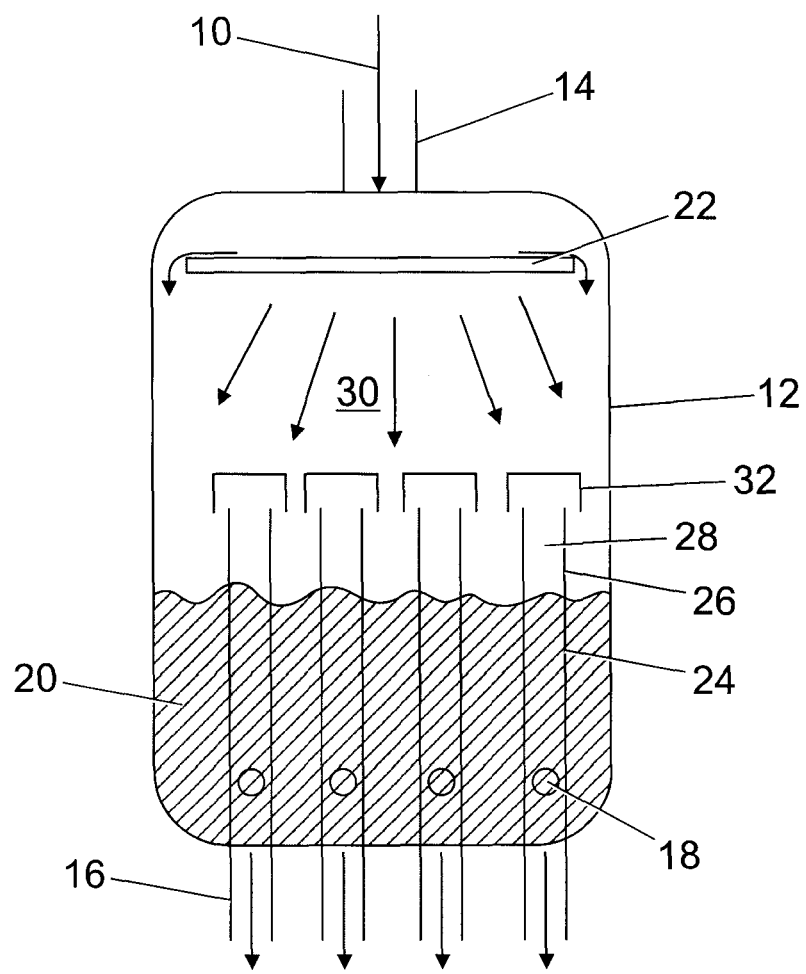
FIG. 2 is a cross sectional side view of a distribution vessel for use in an embodiment of the present invention.

FIG. 2 shows a distribution vessel 12 for use with the present invention. The distribution vessel 12 has one inlet 14 for receiving a mixed vapour and liquid stream 10. As described above, the mixed vapour and liquid stream 10 may be a hydrocarbon stream such as natural gas, or a refrigerant, in particular a mixed refrigerant based on two or more components, preferably selected from the group comprising nitrogen, methane, ethane, ethylene, propane, propylene, butane and pentane. Such a mixed refrigerant can be used in one or more stages of a method, apparatus or plant for liquefying a hydrocarbon stream such as natural gas.

Figure 3:
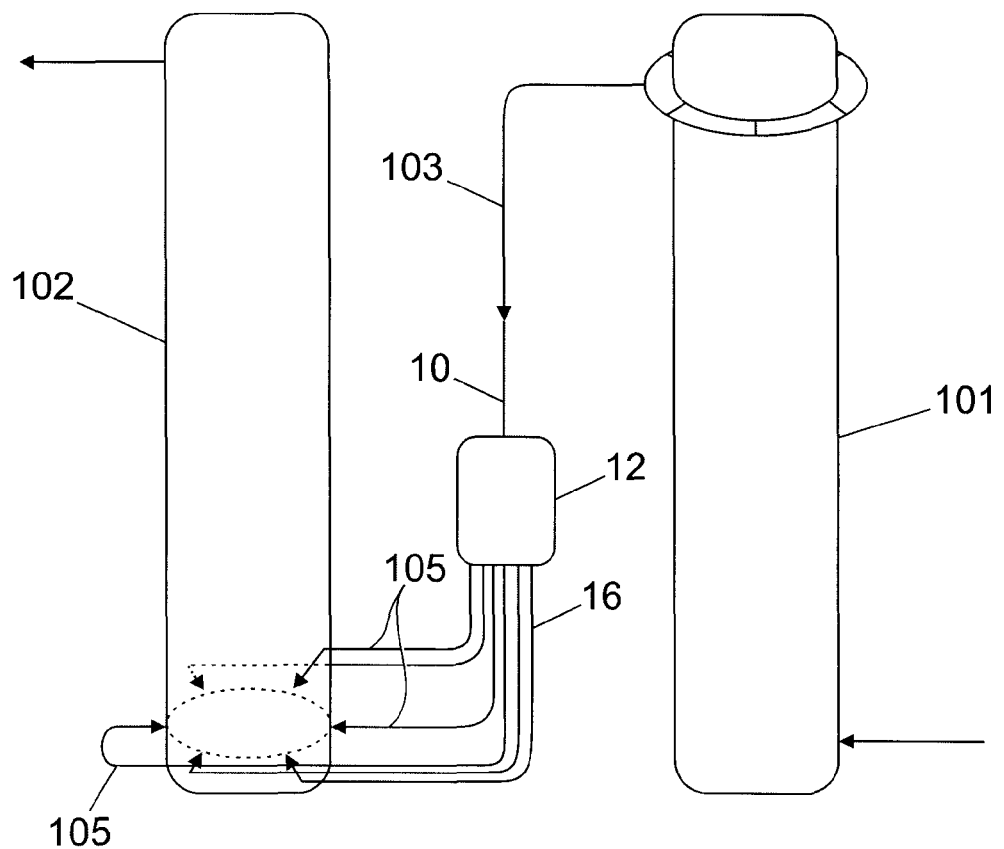
FIG. 3 is a simplified side view of two heat exchangers using the distribution vessel discussed herein.

One use of a mixed refrigerant is in two connected heat exchangers, one usually being a high pressure heat exchanger and the other being a low pressure heat exchanger. One arrangement for two such heat exchangers is shown in FIG. 3 of U.S. Pat. No. 6,389,844 B1. Another possible arrangement is shown in FIG. 1 of EP 1 088 192 B1.

Using the example of a high pressure heat exchanger being the first heat exchanger 1 shown in FIG. 1, the mixed refrigerant is allowed to evaporate at a 'high' pressure therein, and then passes out of the heat exchanger 1 along conduit 3.

The distribution vessel 12 of the present invention is locatable in the conduit 3 shown in FIG. 1 such that its stream is the mixed vapour and liquid stream 10 shown in FIG. 2. This stream 10 enters the distribution vessel 12 via the inlet 14.

The incoming stream 10 can be directed into the body of the distribution vessel 12 by any device or other arrangement adapted to change or direct the flow of the inflowing stream 10. One example is a baffle plate 22 shown in FIG. 2, adapted to create perpendicular flow of the inflowing stream therearound. Another example (not shown) is a vane inlet and distribution device for a liquid/vapour mixture as described and shown in GB 1,119,699 and incorporated herein by way of reference. Such an inlet and distribution device may enter the distribution vessel from either the top in a vertical configuration or the side in a horizontal configuration and is designed to divide the liquid and vapour mixture into columns or other treating zones. It comprises a number of curved guiding vanes, in such a way that each vane intercepts and deflects part of the mixed incoming stream. Such a device is also known as a "Schoepentoeter"™.

The distribution vessel 12 in FIG. 2 allows the liquid part of the mixed stream 10 to collect in a first area 20 in the distribution vessel 12, such first area 20 generally being in the lower part of the distribution vessel 12. Above the first area 20, the vapour part of the mixed stream 10 is collected in a second area 30 which is above the first area 20. Thus, the distribution vessel 12 has created a collective area for the liquid phase of the mixed vapour and liquid stream 10, and a collective area for the vapour phase of the incoming mixed vapour and liquid stream 10.

The distribution vessel 12 can have any design, size, or dimensions, that suit the known or expected flow of mixed vapour and liquid stream 10 from the type of unit, vessel or heat exchanger from which it is provided. Preferably, the size and dimensions of the distribution vessel 12 are such as to achieve a constant level of liquid phase material in the first area 20.

The distribution vessel also has two or more outlets for outflow of the material in the distribution vessel 12, and four outlets 16 are shown by way of example only in FIG. 2. However, the distribution vessel as described herein may have 2 to 20 outlets, preferably 3, 4, 5, 6, 7, 8, 9 or 10 outlets 16, each outlet 16 preferably extending through the distribution vessel 12 at or near its base. Preferably, the outlets 16 pass through the base of the distribution vessel 12 and extend upwardly thereinto. The extent to which the outlets 16 extend into the distribution vessel 12 depends upon the known or expected flow rate of incoming mixed vapour and liquid stream 10, as well as the dimensions of the distribution vessel 12. The arrangement of the outlets 16, the baffle plate 22, and any other elements or features within the distribution vessel 12 can be calculated by a person skilled in the art.

Along the part 24 of the outlets 16 in the first area 20, each outlet 16 has one or more liquid apertures, one liquid aperture 18 per outlet 16 being shown in FIG. 2 by way of example. The liquid apertures 18 are able to pass liquid in the second area 20 into the outlets 16.

The top of each part 26 of the outlets 16 extending into the second area 30 is open ended, so as to create a vapour aperture 28 in each outlet 16 able to pass vapour into the outlet 16. Spaced above the open end vapour apertures 28, bonnets or caps 32 can be located thereover in order to prevent the direct entry of material, particularly liquid material, in the distribution vessel 12 into the vapour apertures 28. The caps 32 create non-direct flows into the vapour apertures 28 to ensure that it is only vapour which is passing thereinto.

In one embodiment, inlet 14 is at or near the top or the distribution vessel 12. Preferably, the inlet 14 is vertical, not being limited to absolute vertical. Alternatively, the inlet for the distribution vessel 12 could enter the distribution vessel at an angle, such angle being at any angle down to horizontal. Where the distribution vessel 12 has more than one inlet, each inlet could enter the distribution vessel 12 vertically, horizontally or any combination of angles therein between.

Similarly, the outlets 16 shown in FIG. 2 extend vertically away from the distribution vessel 12, although they could extend away from the distribution vessel 12 at other angles.

Preferably, the inlet 14, each outlet 16, and optionally even the distribution vessel 12 itself, are all vertical, or vertically arranged, so as to provide generally vertical flow of the mixed vapour and liquid streams and phases therethrough.

Also preferably, the distribution vessel 12 is located in a vertical part, fraction or section of a conduit, such as an intervening conduit between the outlets of a first vessel such as a first heat exchanger, and the inlets of a second vessel such as a second heat exchanger.

Also preferably, the distribution vessel 12 is used or located such as to reduce, more preferably minimise, any horizontal passage or transfer of the mixed vapour and liquid streams provided through its outlets, so as to minimise stratifying of the phases as far as possible prior to their subsequent use.

The configurations of the lines, conduits and streams in the accompanying drawings are not limiting, and are generally figurative in order to better illustrate the present invention.

In use, the distribution vessel 12 is able to provide an equal or uniform flow of liquid phase (from the first area 20) and an equal or uniform flow of vapour phase (from the second area 30) into each of the outlets 16, thus providing greater equality or uniformity of the distribution or ratio of the liquid and vapour phases in each of the outflowing streams from the distribution vessel 12, (compared with the incoming mixed stream 10).

The ratio or distribution of liquid and vapour flows into the outlets 16 will depend on many parameters, including the size and dimensions of the outlets 16, of the liquid apertures 18, of the vapour apertures 28, and of the caps 32. It will also depend on the size and dimension of the distribution vessel 12 itself, and the flow and distribution of the incoming mixed vapour and liquid stream 10. Calculations of these and any other relevant parameters can be made so as to ensure that the distributions of the liquid and vapour phases in the outlets 16 are more equal than the distribution of the initial mixed feed stream 10.

Thus, the distribution vessel 12 is able to make more even the vapour and liquid distribution in two or more streams derived from mixed vapour and liquid stream 10. Preferably, it divides the mixed vapour and liquid stream 10 into a number of parallel streams having the same or similar liquid:vapour ratio, and in this way provides a method of controlling the uniformity of vapour and liquid phases passing through the outlets 16. The distribution of the liquid and vapour phases in the stream in or through each outlet 16 is more equal or uniform with the other outlet streams, than the distribution of liquid and vapour phases in the mixed stream 10 entering the inlet 14.

In an alternative configuration of the distribution vessel (not shown), one or more inlets are provided in the side of the distribution vessel. Such side inlets can enter the distribution vessel at an angle, such angle being at any angle from horizontal up to but not including vertical.

One or more outlets pass through the base of the distribution vessel and extend upwardly thereinto. The outlets are generally as described above but extend into the distribution vessel beyond the level of the one or more inlets, such that the top of every outlet is at a level above the highest inlet. The one or more outlets extend vertically away from the distribution vessel, although they could extend away from the distribution vessel at other angles to provide a generally vertical flow of the mixed vapour and liquid streams and phases therethrough.

FIG. 3 shows the introduction of the distribution vessel 12 into a conduit 103 between first and second heat exchangers 101 and 102, similar to those shown in FIG. 1. The distribution vessel 12 is located below the provision of the mixed vapour and liquid stream from the first heat exchanger 101. Preferably, the distribution vessel 12 is located near the end of the conduit 103, so as to maintain a single conduit between the first and second heat exchangers 101, 102 for at least the majority of the distance thereinbetween.

It is also preferable for the distribution vessel 12 to be located near to the second heat exchanger 102 so as to minimise any horizontal flow of the streams passing from the outlets 16 into the inlets 105. This minimises any stratifying of the mixed outlet streams as discussed above.

The distribution vessel may be of any configuration described herein, such as the embodiment shown in FIG. 2.

The six outlets 16 from the distribution vessel 12 shown in FIG. 3 are preferably directly connected to each of six heat exchanger inlets 105 into the base or lower part of the second heat exchanger 102. By direct introduction of the more equal liquid and vapour streams in each of the outlets 16 into the second heat exchanger 102, there is provided a more even introduction of the mixed liquid and vapour streams into the heat exchanger 102, leading to a more even temperature distribution of the streams and thus more efficient use or processing of the streams through the second heat exchanger 102.

The present invention provides a further advantage by avoiding the need for a distribution ring (such as the distribution ring 7 shown in FIG. 1) around the second heat exchanger 102. The direct passage of the streams from the outlets 16 to the inlets 105 of the second heat exchanger 102 reduces the length of horizontal flow of the streams in order to minimise stratifying due to horizontal flow.

The distribution vessel 12 is usable between any two heat exchangers. Some cooling stages in a hydrocarbon liquefying plant can use 3, 4, 5 or 6 heat exchangers in series, between which there may be mixed liquid and vapour streams. For example, heat exchangers at different pressure levels. The distribution vessel 12 may be useable in a number of locations between such heat exchangers.

The distribution vessel 12 may also be usable to provide greater equality or uniformity of vapour and liquid phases in streams derived from a mixed vapour and liquid stream which is being passed on to two or more different heat exchangers, rather than all the streams being passed to a single further heat exchanger. As an example, one or more of the outlets of the distribution vessel may pass a stream or streams to one heat exchanger, and one or more other outlets may pass a stream or streams to another heat exchanger.

The present invention extends to a method of providing uniformity or providing greater equality of vapour and liquid phases in two or more streams derived from a mixed vapour and liquid stream in a first or pre-cooling stage of a three-stage dual mixed-refrigerant process such as that shown in EP 1088192 A1, the first or pre-cooling stage of the process shown in U.S. Pat. No. 6,389,844 B1, and/or the liquefaction stage or system of any other liquefaction process, in particular those using a multi-phased mixed refrigerant and involving two cryogenic heat exchangers.

The person skilled in the art will understand that the present invention can be carried out in many various ways without departing from the scope of the appended claims.

What is claimed is:

1. A method of providing uniformity of vapour and liquid phases in two or more streams derived from a mixed vapour and liquid stream comprising the steps of:
   (a) passing the mixed vapour and liquid stream from a first heat exchanger into a distribution vessel via one or more distribution vessel inlets, the distribution vessel having two or more distribution vessel outlets connected to a second heat exchanger;
   (b) allowing the liquid part of the mixed stream to collect in a first area in the distribution vessel;
   (c) allowing the vapour part of the mixed stream to collect in a second area of the distribution vessel;
   (d) passing the liquid in the first area into the distribution vessel outlets via one or more liquid apertures in each distribution vessel outlet communicating with the first area; and
   (e) passing the vapour in the second area into the distribution vessel outlets via one or more vapour apertures in each distribution vessel outlet communicating with the second area.

2. A method as claimed in claim 1, wherein the mixed vapour and liquid stream is a refrigerant stream.

3. A method as claimed in claim 1, wherein the mixed vapour and liquid stream is a hydrocarbon stream.

4. A method as claimed in claim 1, wherein the one or more distribution vessel inlets, the two or more distribution vessel outlets and the distribution vessel provide vertical flow of the streams therethrough.

5. A method as claimed in claim 1, wherein the distribution vessel is below the provision of the mixed vapour and liquid stream from the first heat exchanger.

6. A method as claimed in claim 1, wherein the first and second heat exchangers cool a hydrocarbon stream.

7. A method as claimed in claim 1, wherein the first and second heat exchangers are shell-and-tube heat exchangers.

8. A method as claimed in claim 1, wherein the distribution vessel has one distribution vessel inlet at or near the top of the distribution vessel.

9. A method as claimed in claim 1, wherein the distribution vessel has 2 to 20 distribution vessel outlets.

10. A method as claimed in claim 1, wherein each distribution vessel outlet extends upwardly through the distribution vessel, and at least one liquid aperture is located in the side of each distribution vessel outlet near the base of the distribution vessel.

11. A method as claimed in claim 1, wherein each distribution vessel outlet has an end in the distribution vessel, which end is open ended to act as a vapour aperture.

12. A method as claimed in claim 1, wherein the end of each distribution vessel outlet in the distribution vessel has a spaced end cap thereover.

13. A method as claimed in claim 1, wherein the distribution vessel includes a baffle plate near the or each distribution vessel inlet to help distribute the mixed vapour and liquid stream from the or each distribution vessel inlet across or around the distribution vessel.

14. A method of cooling a hydrocarbon stream, the method at least comprising the steps of:
   (i) passing the hydrocarbon stream through a cooling stage involving two or more heat exchangers, between which heat exchangers a mixed vapour and liquid stream passes; and
   (ii) using the method as defined in claim 1, wherein the distribution vessel is provided in the path of the mixed vapour and liquid stream between the heat exchangers.

15. A method as claimed in claim 14, for liquefying a hydrocarbon stream to provide a liquefied hydrocarbon stream.

16. A method as claimed in claim 1, wherein the second area of the distribution vessel is above the first area of the step (b).

17. Apparatus for providing uniformity of vapour and liquid phases in two or more streams derived from a mixed vapour and liquid stream, the apparatus at least comprising:
   a distribution vessel having one or more distribution vessel inlets and two or more distribution vessel outlets, said one or more distribution vessel inlets connected to one or more outlets of a first heat exchanger, and said two or more distribution vessel outlets connected to one or more inlets of a second heat exchanger;
   a first area in the distribution vessel to collect the liquid part of the mixed stream;
   a second area in the distribution vessel to collect the vapour part of the mixed stream;
   one or more liquid apertures in each outlet communicating with the first area, through which the liquid part of the mixed stream can pass; and
   one or more vapour apertures in each outlet communicating with the second area through which the vapour part of the mixed stream can pass.

18. Apparatus as claimed in claim 17, wherein said second area is above the first area.

19. A method of cooling a hydrocarbon stream, the method at least comprising the steps of:
   (i) passing the hydrocarbon stream through a cooling stage involving two or more heat exchangers, between which heat exchangers a mixed vapour and liquid stream passes; and
   (ii) using the apparatus as defined in claim 17, wherein the distribution vessel is provided in the path of the mixed vapour and liquid stream between the heat exchangers.

* * * * *